(12) United States Patent
Meier et al.

(10) Patent No.: US 11,074,451 B2
(45) Date of Patent: Jul. 27, 2021

(54) ENVIRONMENT-BASED APPLICATION PRESENTATION

(71) Applicant: Apple Inc., Cupertino, CA (US)

(72) Inventors: Peter Meier, Los Gatos, CA (US); Daniel Ulbricht, Sunnyvale, CA (US)

(*) Notice: Subject to any disclaimer, the term of this patent is extended or adjusted under 35 U.S.C. 154(b) by 0 days.

(21) Appl. No.: 16/833,364

(22) Filed: Mar. 27, 2020

(65) Prior Publication Data

US 2020/0226383 A1 Jul. 16, 2020

Related U.S. Application Data

(63) Continuation of application No. PCT/US2018/052990, filed on Sep. 26, 2018.

(60) Provisional application No. 62/566,308, filed on Sep. 29, 2017.

(51) Int. Cl.
*G06K 9/00* (2006.01)
*G06T 19/00* (2011.01)

(52) U.S. Cl.
CPC ..... *G06K 9/00671* (2013.01); *G06K 9/00201* (2013.01); *G06T 19/006* (2013.01); *G06K 2209/40* (2013.01); *G06T 2215/16* (2013.01)

(58) Field of Classification Search
None
See application file for complete search history.

(56) References Cited

U.S. PATENT DOCUMENTS

| 2005/0220341 A1* | 10/2005 | Akahori | G06K 9/4647 382/170 |
| 2008/0294400 A1* | 11/2008 | Czora | G06N 3/02 703/6 |
| 2014/0002444 A1 | 1/2014 | Bennett et al. | |

(Continued)

FOREIGN PATENT DOCUMENTS

WO 2016/106383 A2 6/2016

OTHER PUBLICATIONS

Non-Final Office Action received for U.S. Appl. No. 16/370,231, dated Aug. 11, 2020, 23 pages.

(Continued)

*Primary Examiner* — Michelle Chin
(74) *Attorney, Agent, or Firm* — Dentons US LLP

(57) ABSTRACT

In an exemplary process for providing content in an augmented reality environment, image data correspond to a physical environment are obtained. Based on the image data, predefined entities of the plurality of predefined entities in the physical environment are identified using classifiers corresponding to predefined entities. Based on the one or more of the identified predefined entities, a geometric layout of the physical environment is determined. Based on the geometric layout, an area corresponding to a particular entity is determined. The particular entity corresponds to one or more identified predefined entities. Based on the area corresponding to the particular entity, the particular entity in the physical environment is identified using classifiers corresponding to the determined area. Based on the identified particular entity, a type of the physical environment is determined. Based on the type of the physical environment, virtual-reality objects are displayed corresponding to a representation of the physical environment.

23 Claims, 15 Drawing Sheets

(56) References Cited

U.S. PATENT DOCUMENTS

| | | |
|---|---|---|
| 2016/0330522 A1 | 11/2016 | Newell et al. |
| 2016/0350973 A1* | 12/2016 | Shapira et al. |
| 2017/0186291 A1* | 6/2017 | Wenus .................... G01S 3/786 |
| 2017/0243515 A1* | 8/2017 | Vengroff .................. G09B 5/02 |
| 2017/0364766 A1 | 12/2017 | Das et al. |
| 2018/0374276 A1 | 12/2018 | Powers et al. |
| 2019/0122063 A1 | 4/2019 | Kim et al. |
| 2019/0318168 A1 | 10/2019 | Meier et al. |

OTHER PUBLICATIONS

International Preliminary Report on Patentability received for PCT Patent Application No. PCT/US2018/052990, dated Apr. 9, 2020, 7 pages.
International Search Report and Written Opinion received for PCT Patent Application No. PCT/US2018/052990, dated Dec. 5, 2018, 8 pages.
Applicant-Initiated Interview Summary received for U.S. Appl. No. 16/370,231, dated Nov. 3, 2020, 5 pages.
Final Office Action received for U.S. Appl. No. 16/370,231, dated Nov. 17, 2020, 19 pages.

* cited by examiner

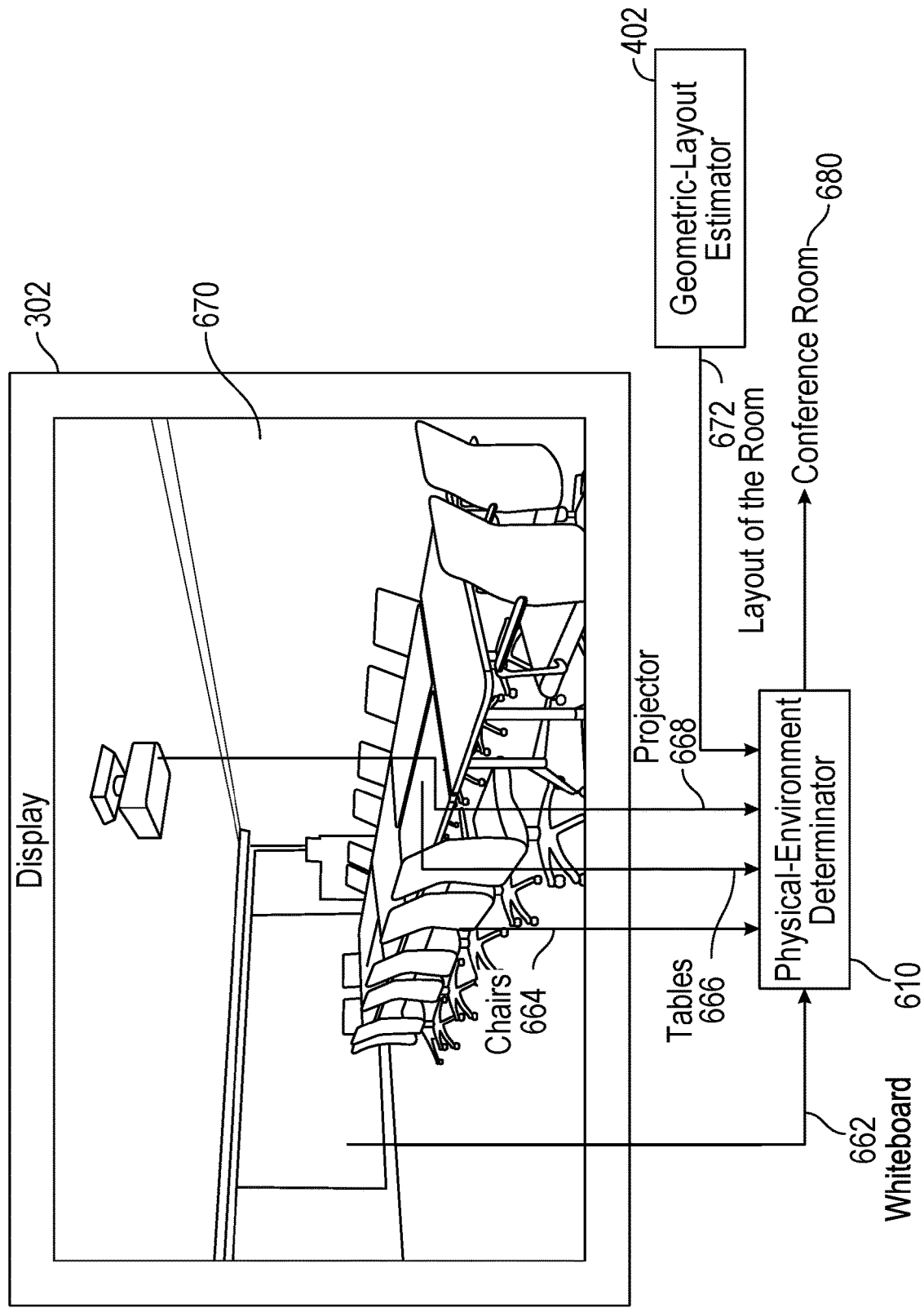

ENVIRONMENT-BASED APPLICATION PRESENTATION

CROSS-REFERENCE TO RELATED APPLICATIONS

This application is a continuation of PCT patent application No. PCT/US2018/052990, entitled "ENVIRONMENT-BASED APPLICATION PRESENTATION," filed Sep. 26, 2018, which claims priority to U.S. provisional patent application No. 62/566,308, entitled "ENVIRONMENT-BASED APPLICATION PRESENTATION," filed on Sep. 29, 2017, the content of which is incorporated by reference for all purposes.

BACKGROUND

The present disclosure relates generally to mixed-reality interfaces, and more specifically to techniques for providing environment-based content in an augmented reality environment.

BRIEF SUMMARY

The present disclosure describes techniques for providing content in an augmented reality (AR) environment. In one exemplary technique, image data captured using the one or more cameras are obtained. The image data correspond to a physical environment. Based on the image data, one or more predefined entities of the plurality of predefined entities in the physical environment are identified using a plurality of classifiers corresponding to a plurality of predefined entities. Based on the one or more of the identified predefined entities, a geometric layout of the physical environment is determined. Based on the geometric layout of the physical environment, an area corresponding to a particular entity is determined. The particular entity corresponds to one or more identified predefined entities. Based on the area corresponding to the particular entity, the particular entity in the physical environment is identified using one or more classifiers corresponding to the determined area. Based on the identified particular entity, a type of the physical environment is determined. Based on the type of the physical environment, one or more virtual-reality objects are displayed corresponding to a representation of the physical environment.

DESCRIPTION OF THE FIGURES

FIG. 6C depicts a physical-environment determinator configured to determine a third type of the physical environment.

DETAILED DESCRIPTION

Figure 1A:
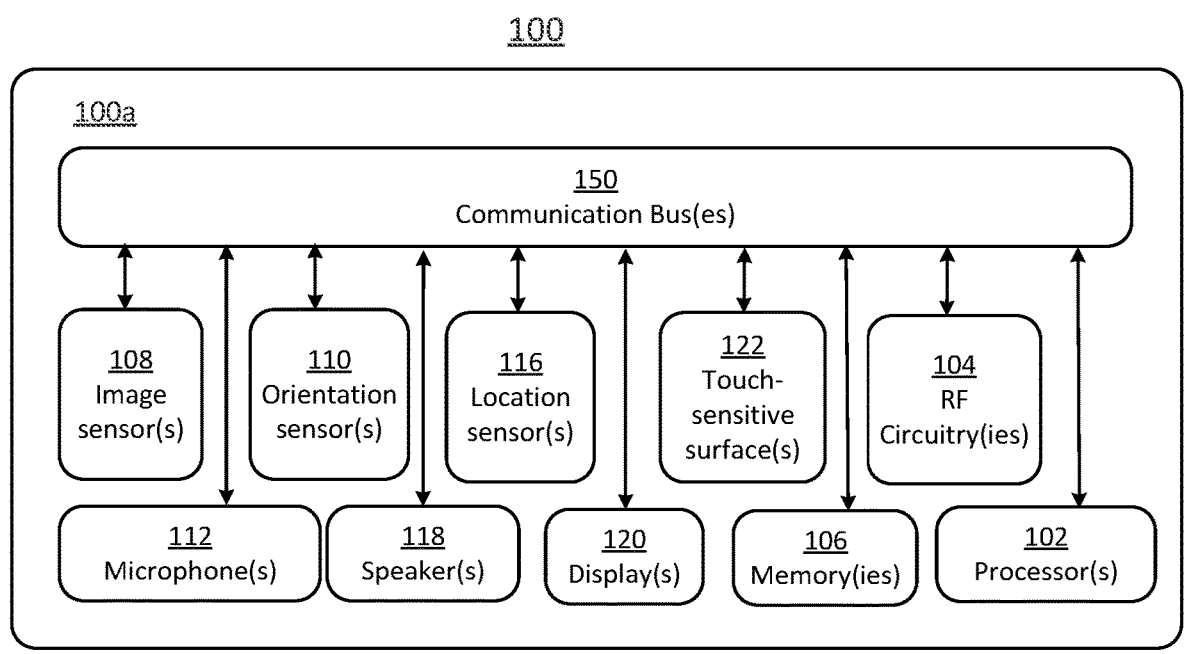
FIGS. 1A-1B depict exemplary systems for use in various computer simulated reality technologies, including virtual reality and mixed reality.

Various embodiments of electronic systems and techniques for using such systems in relation to various simulated reality technologies, including virtual reality and mixed reality (which incorporates sensory inputs from a physical setting), are described.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste. A physical setting may also be referred to as a physical environment or a real environment. A physical element may also be referred to as a physical object or a physical article.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting. A virtual object is sometimes also referred to as a virtual reality object or a virtual-reality object.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationary with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

An AR environment can provide an intuitive interface for a user to interact with his/her physical environment. For example, using an AR interface that displays an image of the user's physical environment, a user device can provide virtual-reality objects to the user. Specifically, using the AR interface, the user can interact with virtual-reality objects provided at the augment-reality interface to perform certain tasks (e.g., control a coffee machine). One challenge for implementing such an application is that the virtual-reality objects may not be provided based on the physical environment. For example, a user may be standing in a kitchen while virtual-reality objects related to living room entertainment are provided at the AR interface. These virtual-reality objects would thus have limited relevance to the physical environment in which the user is currently located. Conventional techniques for determining the user's position, such as global positioning system (GPS) techniques, typically have a positioning error in the range of meters, making it difficult to determine the precise physical environment (e.g., living room, kitchen, bedroom) within, for example, a house or building. In addition, current techniques for identifying entities in the physical environment are too time consuming to provide real-time response as a user moves about. For example, current techniques may use a large number of classifiers in identifying particular entities in a physical environment which slows the overall identification process.

In accordance with some embodiments described herein, image data corresponding to a physical environment are obtained using one or more cameras of a user device. The user device performs hierarchical classification to identify one or more particular entities in the physical environment. For example, the user device performs an initial classification using a subset of predefined classifiers that is less than the full set of available classifiers. The initial classification identifies one or more predefined entities. A geometric layout of the physical environment is estimated based on the identified one or more predefined entities. An area is determined based on the geometric layout and a second level classification is performed using classifiers corresponding to the determined area. The user device can thus identify particular entities in the determined area. Because not all available classifiers are used for all entities, the hierarchical classification improves the performance of identifying particular entities in a physical environment, reduces power consumption, and enables real-time classification. Based on the identified particular entities, the user device determines the type of physical environment (e.g., living room, kitchen, bedroom, etc.) corresponding to the image data the user device obtained, and then displays virtual-reality objects corresponding to a representation of the physical environment. As a result, the displayed virtual-reality object are environment-based and are thus relevant to the type of physical environment (e.g., living room, kitchen, bedroom) within, for example, a house or building. Providing environment-based services to the user enhances the user experience and improves the performance of the system.

Figure 1B:
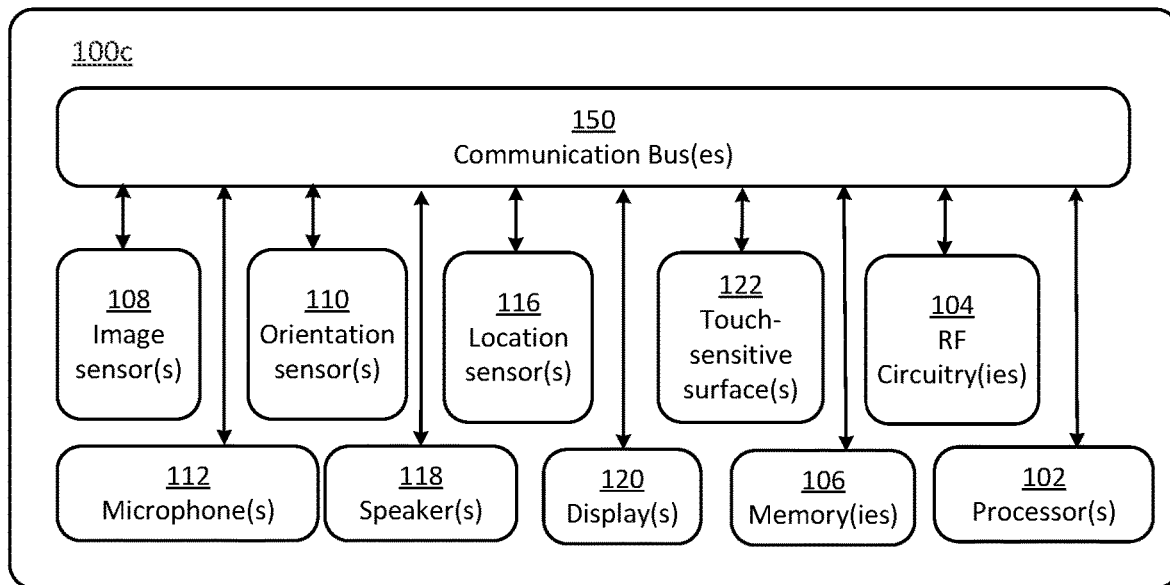
Figure 1B:
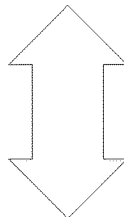
Figure 1B:
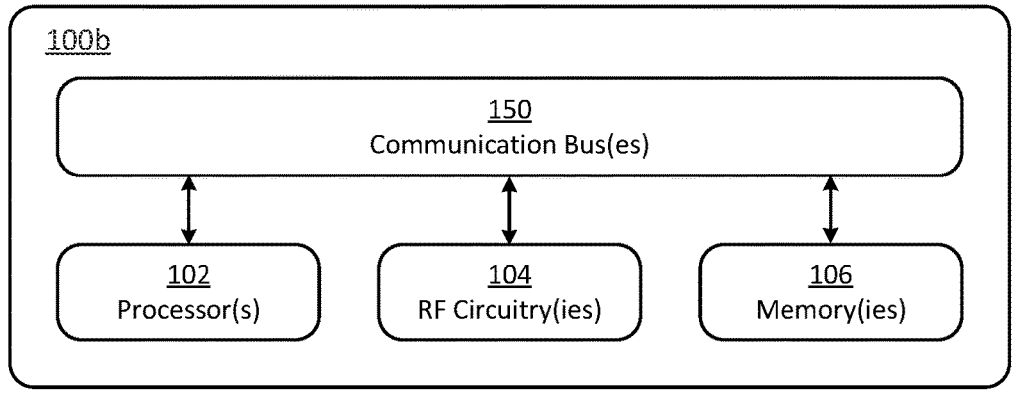

FIG. 1A and FIG. 1B depict exemplary system 100 for use in various simulated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a second device (e.g., a head-mounted device. In some examples, device 100a is implemented in a base station device or a second device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some embodiments, system 100 is a projection-based system that uses retinal projection to project images onto an individual's retina or projects virtual objects into a physical setting (e.g., onto a physical surface or as a holograph). In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some embodiments, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Turning now to FIGS. 2A-2B, 3A-3B, 4, 5, 6A-6C, and 7A-7C, exemplary electronic devices and user interfaces for providing content in an AR environment on an electronic device (e.g., 100a), in accordance with some embodiments, are described. The figures are used to illustrate the processes described below, including the process in FIG. 8.

Figure 2A:
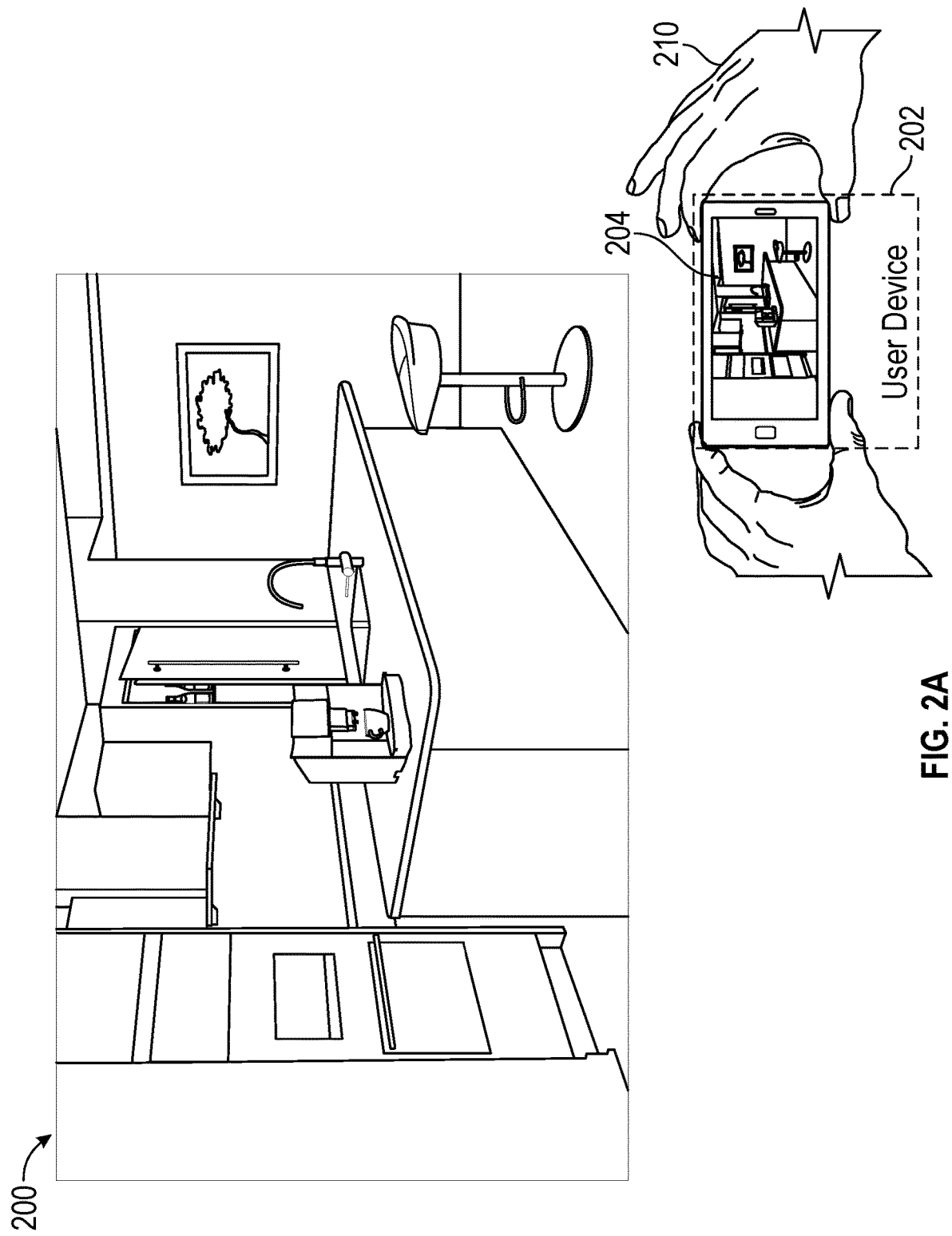
FIG. 2A depicts a user device obtaining image data of an indoor physical environment and displaying an image of the indoor physical environment.

FIG. 2A depicts a user device 202 obtaining image data of an indoor physical environment 200 and displaying representation 204 (e.g., an image) of the indoor physical environment, according to various embodiments. In the present embodiment, user device 202 is a standalone device, such as a hand-held mobile device (e.g., a smartphone) or a standalone head-mounted device. It should be recognized that, in other embodiments, user device 202 can be communicatively coupled to another device, such as a base device (e.g., base device 102b. In these embodiments, the operations described below for providing environment-based content in an AR environment can be shared between user device 202 and the other device.

FIG. 2A illustrates an example where a user 210 holds user device 202 in the user's hand. In some embodiments, user 210 wears a user device as a head-mounted device. User device 202 can obtain image data using one or more cameras. Exemplary cameras include charge-coupled device (CCD) type cameras and event cameras.

In some embodiments, user device 202 displays representation 204 of the indoor physical environment using the obtained image data. Representation 204 is a live 2D image or 3D image of the physical environment. Physical environment 200 is, for example, the real-world physical environment in the direction the user device is facing or in which the user device is located. In FIG. 2A, physical environment 200 is at least a portion of the user's kitchen that is in front of the user or in which the user is located. A physical environment can be an indoor environment or an outdoor environment. In an indoor environment, a physical environment can be a specific room or area (e.g., living room, family room, office, kitchen, classroom, cafeteria, or the like) in which the user device is located or in the direction the user device is facing. As described in more detail below, user device 202 can provide content (e.g., virtual-reality objects) to the user based on the physical environment. For example, if the physical environment is a kitchen, user device 202 can display corresponding virtual-reality objects, such as a food recipe, a remote controller of a coffee machine, or a user interface for ordering food. If the physical environment is a living room, user device 202 can display corresponding virtual-reality objects, such as a remote controller of a TV, a user interface for ordering movies, or a user interface for subscribing magazines. If the physical environment is a classroom, user device 202 can display corresponding virtual-reality objects, such as a virtual-reality book or notes.

Figure 2B:
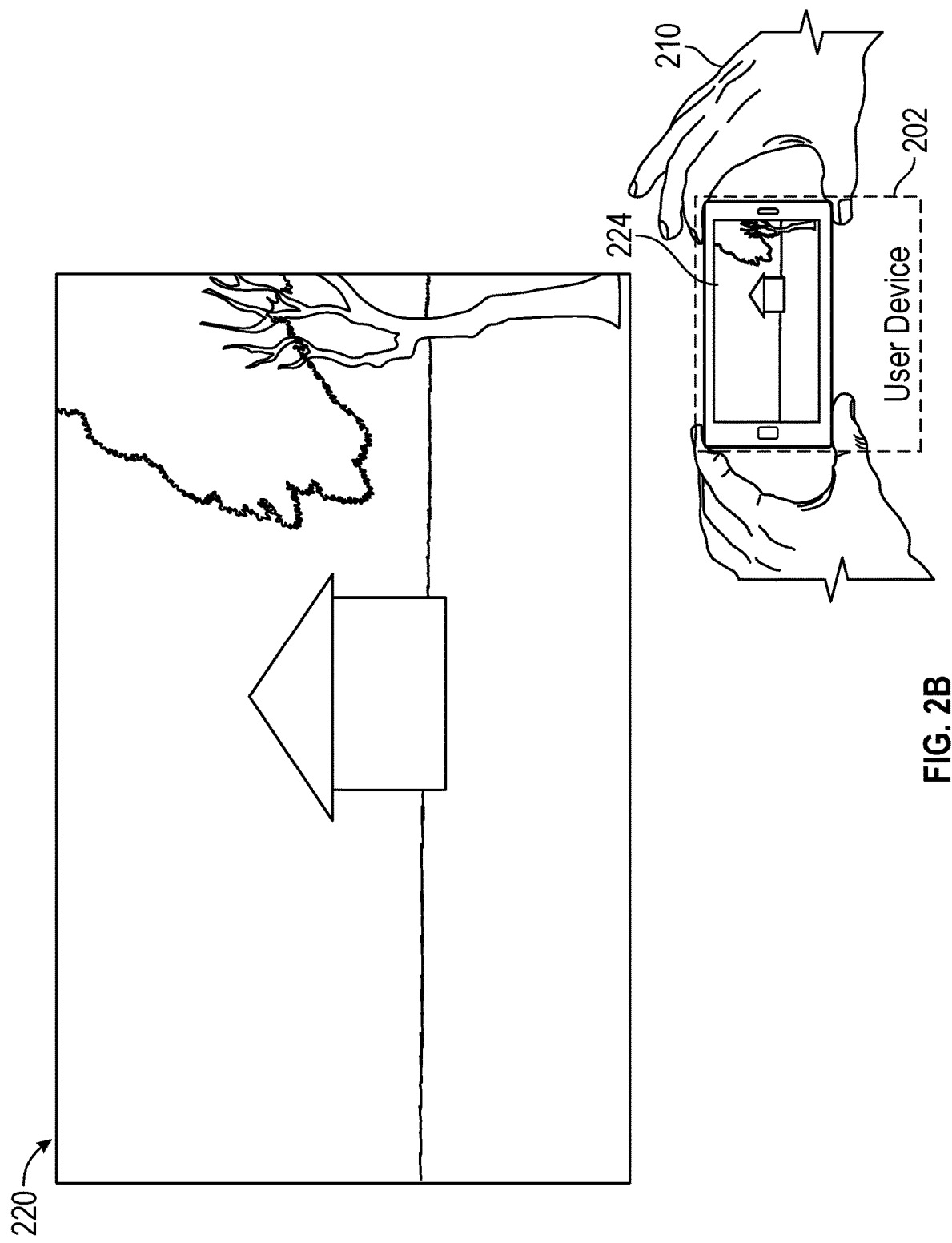
FIG. 2B depicts a user device obtaining image data of an outdoor physical environment and displaying an image of the outdoor physical environment.

FIG. 2B depicts user device 202 obtaining image data of an outdoor physical environment 220 and displaying a representation 224 (e.g., an image) of the outdoor physical environment, according to various embodiments. Similar to those described above, in the present embodiment, physical environment 220 is at least a portion of a park that is in front of the user or in which the user is located. In an outdoor environment, a physical environment can be a specific area in which the user is located or in the direction the user is facing. User device 202 can provide content (e.g., virtual-reality objects) to the user based on the physical environment. For example, if the physical environment is a portion of a park that includes a lake, an animal, and/or a building (as illustrated in FIG. 2B), user device 202 can display virtual reality objects, such as a user interface for ordering recreational equipment (e.g., a boat), an identification of the animal (e.g., a deer), or a video regarding (e.g., describing) the building.

In some embodiments, a user device is configured to identify, based on the image data captured and/or recorded by one or more cameras, one or more predefined entities of a plurality of predefined entities in the physical environment, for instance, using a plurality of classifiers. A classifier can configured to perform image analysis and classification to identify entities in the physical environment. For example, a classifier is configured to analyze the properties of various image features and organizes data into classes. In some embodiments, a classifier is configured to perform two phases of processing: a training phase and an analyzing phase. In the training phase, characteristic properties of typical image features are isolated and a description of each class is generated based on the characteristic properties. In the analyzing phase, classifiers are configured to identify features of an image to-be-analyzed, and identify one or more entities of a physical environment based on the identified features.

Figure 3A:
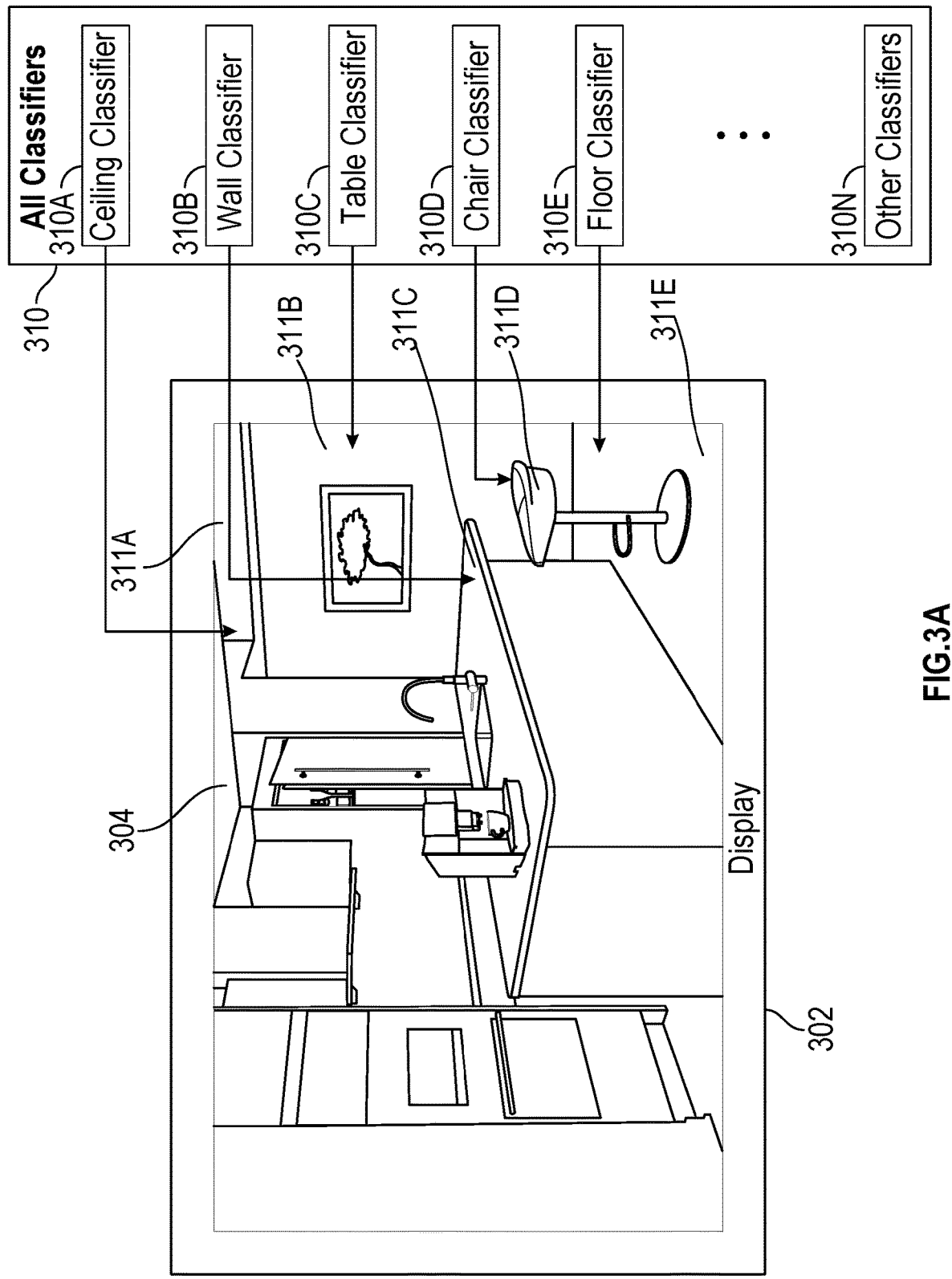
FIG. 3A depicts classifiers of a user device configured to identifying predefined entities of an indoor physical environment.

FIG. 3A depicts classifiers 310A-E of a user device configured to identify one or more predefined entities of an indoor physical environment. As depicted in FIG. 3A, representation 304 is an image captured or recorded by one or more cameras of the user device. In some embodiments, while displaying representation 304 on a display, the user device performs initial classification using predefined classifiers 310A-E. Classifiers 310A-E are a subset of classifiers 310A-N that are available to user device 302. As described, under some circumstances (e.g., there is a large number of available classifiers), using all available classifiers to identify each entity in a physical environment based on representation 304 may be impractical or undesirable, because it may cause excessive delay in identifying each entity, may have an inaccurate identification, and may not provide a desirable user experience. Thus, in some embodiments, an initial classification can be performed such that a limited number of predefined classifiers are used to identify one or more predefined entities in a physical environment.

As illustrated in FIG. 3A, in some embodiments, for an indoor environment, such as a kitchen, the predefined classifiers for initial classification include a ceiling classifier 310A, a wall classifier 310B, a table classifier 310C, a chair classifier 310D, and a floor classifier 310E. Other classifiers (e.g., a coffee machine classifier, a person classifier) are excluded from the classifiers used for the initial classification. The predefined classifiers for the initial classification can thus identify predefined entities, such as ceiling, table, wall, chair, and floor, for the purpose to determining geometric layout of the physical environment. In some examples, the user device can be configured to further determine whether an identified physical object or predefined entity is indicated as having low mobility (e.g., low mobility relative to other physical objects or predefined entities). For example, the user device can obtain one or more properties associated with the identified physical object, and determine whether the identified physical object has low mobility (or high mobility). For example, a ceiling or a floor has low or no mobility, while a table may have low or medium mobility and a chair may have medium or high mobility. It is appreciated that the type of classifiers used for initial classification (e.g., ceiling classifier, floor classifier, table classifier, chair classifier) can be predefined based on expected use of the device (e.g., used at a home environment) in any desired manner. In some embodiments, the type of classifiers used for initial classification can also be learned or trained using machine learning techniques. For example, based on training data associated with different physical environments, such as those in which the user device has been used in the past (e.g., the physical environments in which the user device has been frequently used are living room, kitchen, etc.), the type of classifiers for initial classification (e.g., ceiling classifier, floor classifier, table classifier) can be derived or determined.

In some embodiments, to identify one or more entities of a plurality of predefined entities based on the representation 304, the predefined classifiers for initial classification (e.g., classifiers 310A-E) are configured to determine, for each unit of the obtained image data corresponding to representation 304, one or more candidate classes. For example, the predefined classifiers for initial classification can be configured to search each pixel or a group of pixels of representation 304 to determine one or more candidate classes of the pixel or group of pixels. A pixel or a group of pixels of representation 304 (e.g., a 2D image), for instance, is classified to correspond to a plurality of candidate classes, such as wall, table, and ceiling. The classifiers can be configured to rank the candidate classes for a pixel or for a group of pixels. For example, based on the probabilities that a pixel or a group of pixels corresponds to a characteristic feature of a known class, the candidate classes can be ranked from the highest probability to the lowest probability (e.g., a particular group of pixels has a higher probability to be a table class, rather than a chair class).

Next, the classifiers can be configured to determine one or more classes of the ranked candidate classes as the classes corresponding to the one or more predefined entities in the physical environment. For example, ceiling classifier 310A can be configured to determine that a ceiling class is the highest ranked class corresponding to the group of pixels in area of ceiling 311A of representation 304; wall classifier 310B can be configured to determine that a wall class is the highest ranked class corresponding to the group of pixels in area of wall 311B of representation 304; the table classifier 310C can be configured to determine that a table class is the highest ranked class corresponding to the group of pixels in area of table 311C of representation 304, and so forth.

Figure 3B:
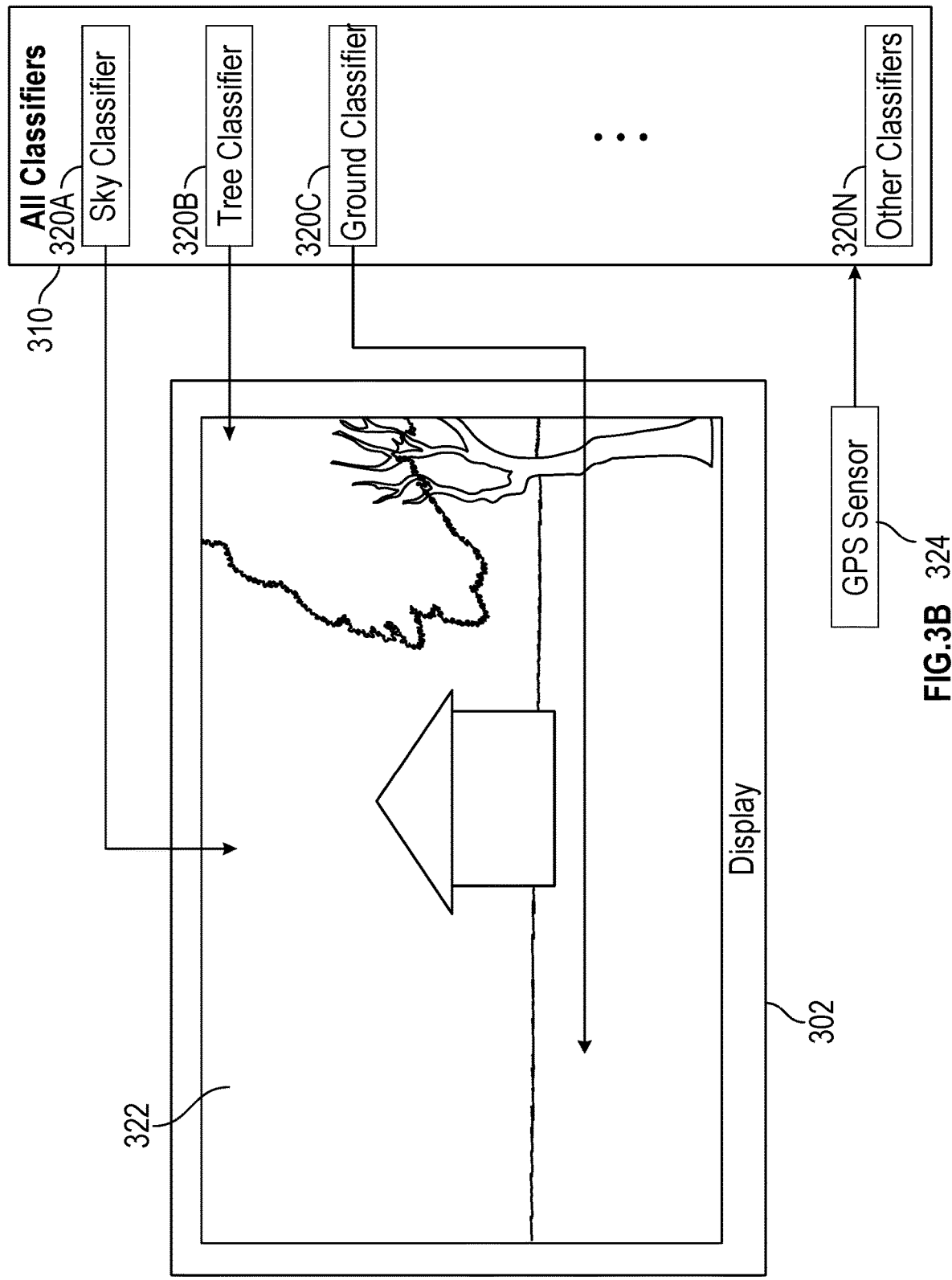
FIG. 3B depicts classifiers of a user device configured to identifying predefined entities of an outdoor physical environment.

FIG. 3B depicts another set of classifiers 320A-C of a user device that are configured to identify predefined entities of an outdoor physical environment. Similar to those described above, representation 322 of the physical environment is an image of an outdoor environment (e.g., a park) that the user device captured or recorded using one or more cameras. The user device displays representation 322 corresponding to the outdoor environment on display 302. In some embodiments, while displaying representation 322 on a display, the user device can perform initial classification using a limited number of classifiers 320A-C of all available classifiers 310A-N. The predefined classifier 320A-C for initial classification includes, for example, a sky classifier 320A, a tree classifier 320B, and a ground classifier 320C. The type of classifiers 320A-C (e.g., a sky classifier, a tree classifier, a ground classifier) can be predefined by the user and/or and learned/trained using machine learning techniques. In some embodiments, the type of predefined classifiers 320A-C for initial classification can be obtained based on context information such as the position of the user device provided by a global positioning system (GPS) sensor 324. For instance, if the GPS position indicates that the user is likely in a park or otherwise outdoors, a plurality of predefined outdoor-related classifiers (e.g., sky classifier 320A, tree classifier 320B, ground classifier 320C) are used for the initial classification and indoor-related classifiers (e.g., ceiling classifier 310A, wall classifier 310B) are excluded.

As described, for initial classification, a set of predefined classifiers corresponding to a plurality of predefined entities are used to identify one or more predefined entities based on a representation of the physical environment (e.g., the captured or recorded image). The set of predefined classifiers used for initial classification is a subset of classifiers less than the full set of available classifiers. As described more in detail below, a subset of classifiers can be used for an initial sorting of the physical environment at an improved speed. Subsequently, particular classifiers are used to classify entities in a specific area identified using the initial sorting. The hierarchical classification using two or more levels of classifiers can thus provide accurate classification at an improved speed, thereby enhancing user experience for the purpose of providing content (e.g., virtual-reality objects) based on the physical environment.

As illustrated in FIG. 3A and described above, based on the obtained image data, a plurality of classifiers corresponding to a plurality of predefined entities can be configured to identify one or more predefined entities in the physical environment (e.g., ceiling 311A, wall 311B, table 311C, chair 311D, floor 311E). Based on these identified predefined entities, a geometric-layout estimator of the user device can be configured to determine a geometric layout of the physical environment.

Figure 4:
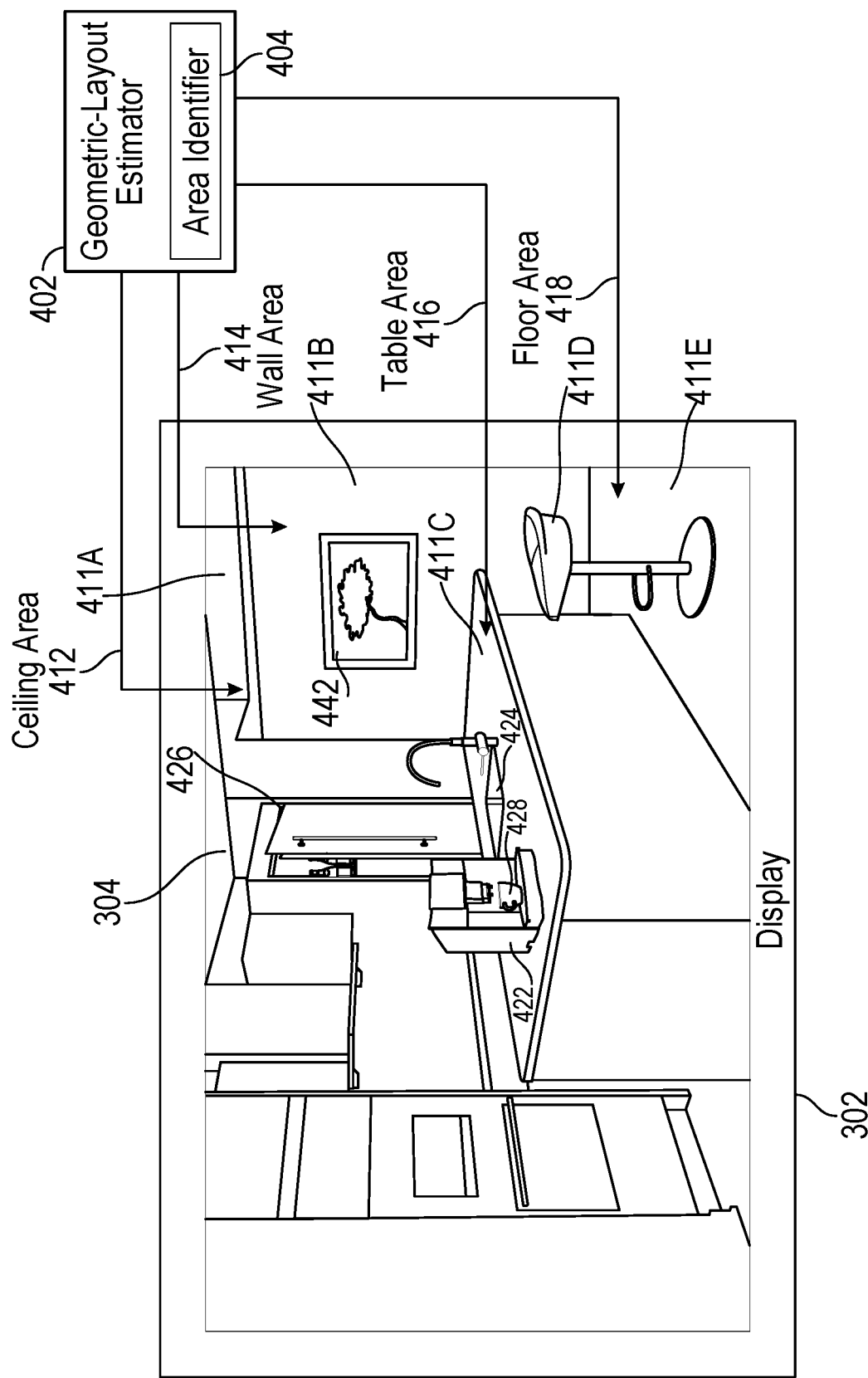
FIG. 4 depicts a geometric-layout estimator determining geometric layout of the physical environment and areas corresponding to particular entities.

FIG. 4 depicts a geometric-layout estimator 402 that is configured to determine geometric layout of the physical environment and areas corresponding to particular entities. With reference to FIG. 4, geometric-layout estimator 402 is configured to estimate, for example, the layout of a physical environment, such as a kitchen shown in representation 304. In some embodiments, to determine the layout of the physical environment, geometric-layout estimator 402 is configured to determine spatial information associated with the one or more identified predefined entities. As illustrated in FIG. 4 and described above, one or more predefined entities, such as a ceiling, a wall, a floor, a table, and/or a chair, are identified. Geometric-layout estimator 402 is configured to determine the spatial positions of the identified predefine entities with respect to a base coordinate system and/or with respect to each other. In some examples, as illustrated in FIG. 4, the geometric layout includes a surface representing a countertop. Geometric-layout estimator 402 is further configured to determine relative alignment of the entities. For example, using absolute or relative spatial positions of the identified entities, geometric-layout estimator 402 determines that ceiling 411A is above table 411C, which is in turn above the floor 411E; and that the wall 411B is between the ceiling 411A and floor 411E. In some embodiments, the base coordination system is established prior to the determination of the spatial positions.

In some embodiments, geometric-layout estimator 402 further is configured to determine the depth information associated with the one or more identified predefined entities. For example, using a plurality of cameras (e.g., digital cameras, infrared cameras), the distance between each of the identified predefined entities and the user device is determined. The distance is determined based on the discrepancies of the 3D perception captured by two or more cameras. As another example, a depth sensor (e.g., a 3D time-of-flight sensor) is used to determine the distance between each of the identified predefined entities and the user device. A depth sensor may be, for example, a LiDAR system.

In accordance with the spatial information and the depth information, geometric-layout estimator 402 is configured to determine the geometric layout of the physical environment. With reference to FIG. 4, for example, geometric-layout estimator 402 determines the layout of a kitchen with ceiling 411A, one or more walls 411B, table 411C, one or more chairs 411D, and floor 411E. The layout of the kitchen indicates the spatial relation of the entities with respect to each other and the distances of the entities from the user device (e.g., the point of view of the cameras).

In some embodiments, geometric layout estimation can be performed based on the identified entities (e.g., identified by classifiers using the entities' characteristic features, such as color, shape, texture, and edge) and a detection of one or more vanishing points. Geometric-layout estimator 402 is configured to perform post-processing to generate one or more layout hypotheses using, for example, structured support vector machines (SVM) and/or conditional random fields (CRFs) techniques. Thus, a 3D reconstruction of the layout of the physical environment can be obtained with knowledge of the 2D layout and vanishing points. In some embodiments, geometric-layout estimator 402 is configured to use rapid convolution neural network (R-CNN), fully convolution network (FCN), and/or any other neural network or machine learning techniques to estimate the layout of a physical environment.

With reference to FIG. 4, based on the geometric layout of the physical environment, an area identifier 404 is configured to determine an area corresponding to a particular entity. The particular entity corresponds to one or more identified predefined entities in some embodiments. As illustrated in FIG. 4, as described above, a set of classifiers for initial classification is configured to identify predefined entities, such as a ceiling, a wall, a table, a chair, and a floor. A particular entity can be an entity associated with the predefined entities identified in the initial classification. For example, a particular entity can be a coffee machine 422 disposed on top of table 411C; a sink 424 embedded in table 411C, a cabinet 426 mounted on wall 413, a cup disposed in coffee machine 422, or the like. As described above, geometric-layout estimator 402 is configured to determine the layout of the physical environment. Using the layout of the physical environment, area identifier 404 is configured to identify one or more areas of the physical environment. For example, with reference to FIG. 4, based on the layout of the kitchen, area identifier 404 identifies a ceiling area 412, a wall area 414, a table area 416, a floor area 418, or the like.

In some embodiments, to determine the area corresponding to a particular entity, area identifier 404 is configured to determine a spatial position and/or orientation of the particular entity (e.g., coffee machine 422) within the physical environment (e.g., the kitchen). Note that when area identifier 404 determines the area, the particular entity may not be identified. For example, area identifier 404 can be configured to determine that a particular area corresponds to a particular entity (e.g., determine that there is a particular entity located within a wall area) without identifying the classification of the particular entity (e.g., without identifying that the particular entity is a photo frame). In some embodiments, area identifier 404 is configured to determine the area corresponding to a particular entity using a base coordinate system. Based on the spatial position of the particular entity and the geometric layout of the physical environment, area identifier 404 determines one or more candidate areas corresponding to the particular entity. Using coffee machine 422 as an example, area identifier 404 can determine that its spatial position falls within the spatial positions of the area of table 411C, and thus determine that the area of table 411C corresponds to coffee machine 422. In some embodiments, area identifier 404 may determine that two or more areas correspond to a particular entity. For example, with reference to FIG. 4, based on the spatial position of a photo frame 442, area identifier 404 may determine that ceiling area 412, wall area 414, and floor area 418 all correspond to the photo frame 442 (e.g., the spatial positions of photo frame 442 falls within the positions of ceiling area 412, wall area 414, and floor area 418). In some embodiments, area identifier 404 can rank the plurality of areas (e.g., based on the distances between photo frame 442 and each of the different areas 412, 414, and 416), and select one of the plurality of candidate areas as the area corresponding photo frame 442 (e.g., wall area 414).

Figure 5:
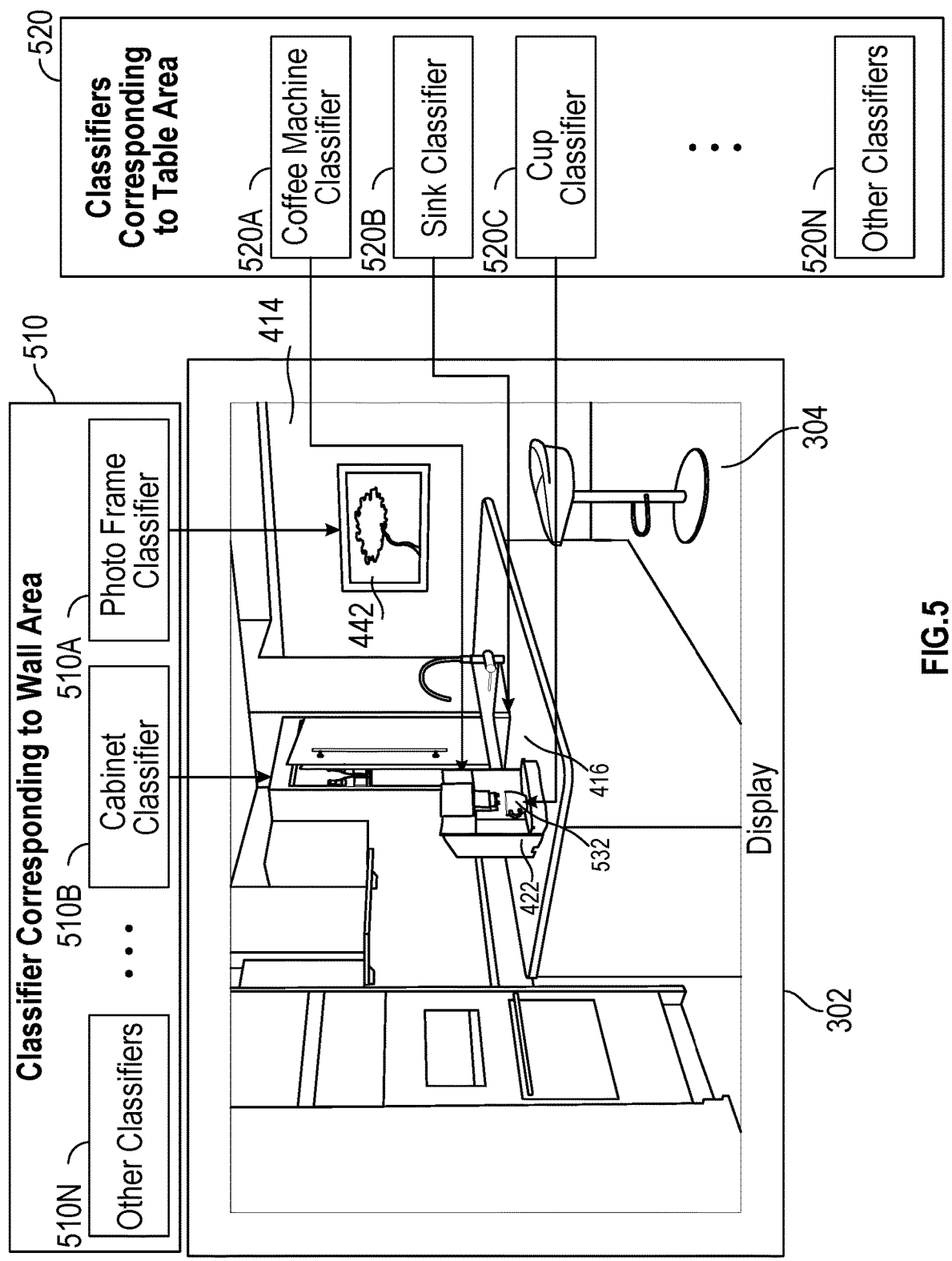
FIG. 5 depicts classifiers corresponding to a wall area for identifying particular entities located in the wall area, and classifiers corresponding to a table area for identifying particular entities located in the table area.

With reference to FIG. 5, based on the determined area corresponding to a particular entity, the user device is configured to identify the particular entity in the physical environment using one or more classifiers corresponding to the determined area. FIG. 5 depicts classifiers 510 corresponding to a wall area configured to identify particular entities located in or associated with the wall area, and classifiers 520 corresponding to a table area configured to identify particular entities located in or associated with the table area. As described, in the initial classification for identifying predefine entities, such as ceiling, wall, floor, or the like, a subset of classifiers less than a full set of all available classifiers are used. In some embodiments, after initial classification, a second level of classification (e.g., a more focused classification of particular entities in a particular area) can be performed upon determining the area corresponding a particular entity. For instance, with reference to FIG. 5, upon determining that a particular entity to-be-identified is located within table area 416, the user device obtains one or more classifiers corresponding to table area 416. The one or more classifiers may include, for example, a coffee machine classifier 520A, a sink classifier 520B, a cup classifier 520C, or any other classifiers that is associated with a table area.

Similar to the initial classification, the user device is configured to, using the one or more classifiers corresponding to the determined area, determine one or more candidate classes associated with a particular entity located in or associated with the determined area. For example, the classifiers 520A-N corresponding to the table area 416 can be configured to search each pixel of the image of table area 416, individually or in combination, to determine one or more candidate classes associated with a particular entity. Using coffee machine 422 as an example, a pixel or a group of pixels of image area corresponding to coffee machine 422 may be classified to correspond to candidate classes, such as coffee machine, toaster, baking oven, fountain drink machine, or the like. The classifiers 520A-N can be configured to rank the candidate classes for a pixel or for a group of pixels. For example, based on the probabilities that a pixel or a group of pixels corresponds to a characteristic feature of a known class, the candidate classes can be ranked from the highest probability to the lowest probability (e.g., a particular group of pixels correspond to a coffee machine, rather than a toaster). Next, the classifiers can be configured to determine one or more classes of the ranked candidate classes as the classes corresponding to the one or more predefined entities in the physical environment. For example, the coffee machine classifier 520A can determine that a coffee machine class is the highest ranked class corresponding to the group of pixels associated with the particular identity to-be-identified in table area 416. As a result, the coffee machine class is selected for the particular entity to-be-identified; and user device thus identifies the particular entity as coffee machine 422.

With reference to FIG. 5, similarly, the user device is configured to, upon determining that wall area 414 corresponds to a particular entity, obtain one or more classifiers 1010A-N corresponding to wall area 414. For example, classifiers 510A-N can include a photo frame classifier 510A, a cabinet classifier 510B, and any other classifiers corresponding to a wall area. The user device determines, using one or more of classifiers 510A-N corresponding to the determined area, one or more candidate classes associated with the particular entity; ranks the one or more candidate classes (e.g., based on machine learning models); and selects one of the one or more ranked candidate classes as the class corresponding to the particular entity. As illustrated in FIG. 5, classifiers 510A-N are configured to determine that the candidate classes of a particular entity to-be-identified in wall area 414 includes a photo frame, a painting, a rug, a wallpaper, or the like. Classifiers 510A-N are configured to rank the classes from the highest probability to the lowest probability using machine learning techniques (e.g., based on characteristic features of each class learned during the training phase). The user device select the class with the highest probability. As illustrated in FIG. 5, classifiers 510A-N may thus be used to select the photo frame class as the class for photo frame 442.

Similar to the initial classification, classifiers used in the second level classification can be obtained based on context information such as the position of the user device provided by a global positioning system (GPS). For instance, if the GPS position indicates that the user device is likely in a park or otherwise outdoor, a coffee machine classifier is excluded even if the determined area is a table area. Instead, outdoor picnic-related classifiers (e.g., a cooler classifier, a bar-b-que rack classifier, etc.) may be obtained.

In the above example of identifying a particular entity, such as a coffee machine, an initial classification and a second level classification are described. It is appreciated that the user device can perform hierarchical classifications using any number of levels. For example, the user device can be configured to identify, using one or more classifiers corresponding to the identified particular entity, a second particular entity in the physical environment different from the identified particular entity. With reference to FIG. 5, upon identifying that the particular entity in table area 416 is coffee machine 422, the user device can be configured to iteratively identify a second particular entity using classifiers corresponding to the identified coffee machine 422. Classifiers corresponding to coffee machine 422 may include, for example, cup classifier 520C, coffee bag classifier, etc. For instance, the user device can identify, using a cup classifier 520C, a cup 532 located in or used with coffee machine 422.

It will be further appreciated that the user device can be configured to identify a plurality of particular entities or physical objects (e.g., all or a large number of particular entities) in the physical environment using hierarchical classifications. For example, with reference to FIG. 6A, the user device can be configured to identify particular entities including a baking oven 612, a microwave 614, a coffee machine 616, a sink 618, or the like. Hierarchical classifications improve the performance of classification by avoiding using all available classifiers to classify each particular entity in the physical environment, which can be time consuming and impractical.

Figure 6A:
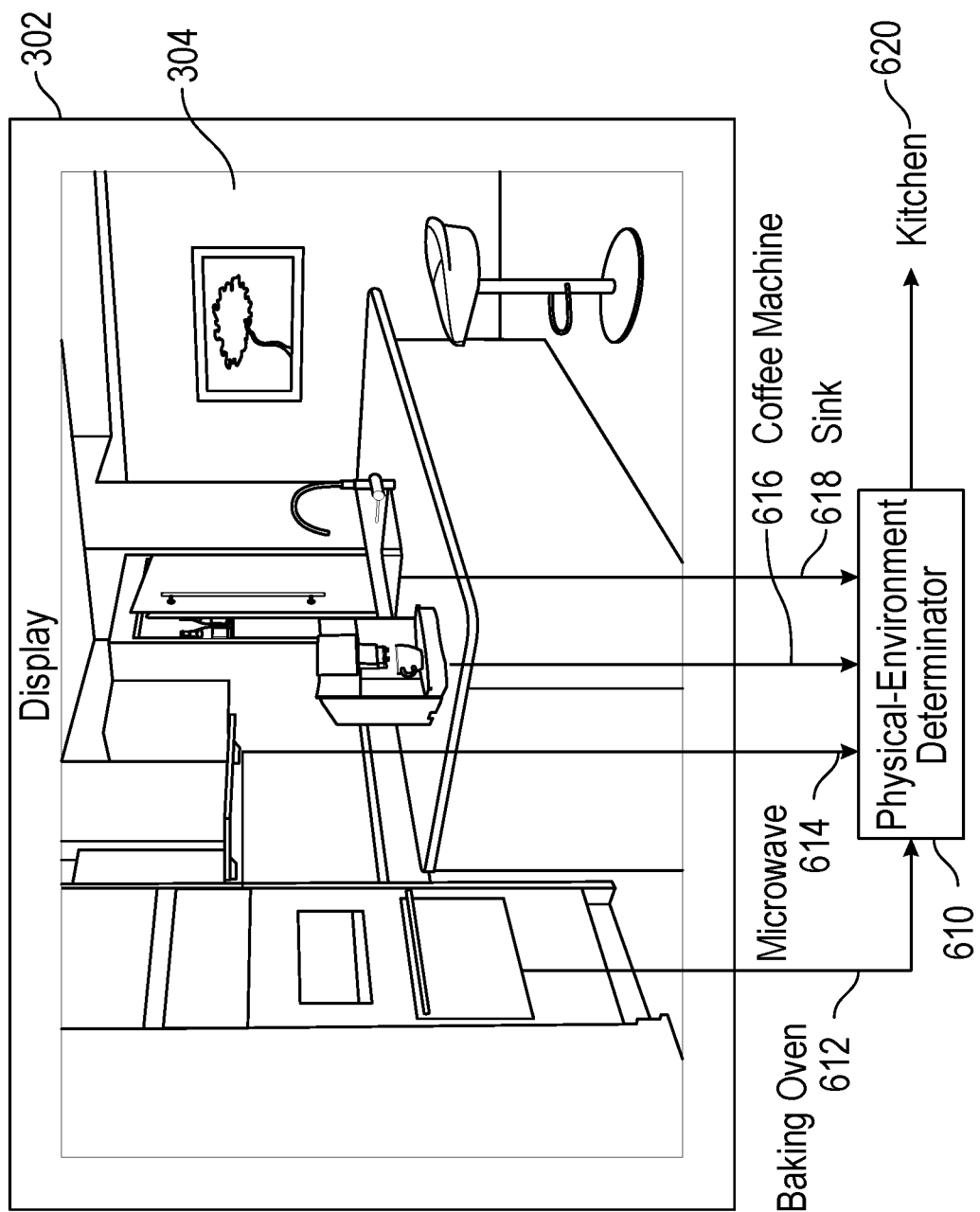
FIG. 6A depicts a physical-environment determinator configured to determine a first type of the physical environment.

In some embodiments, the user device can be configured to, based on the one or more identified particular entities, determine the type of the physical environment. For instance, the user device may store a plurality of predefined types of physical environment, such as kitchen, living room, family room, bedroom, conference room, class room, etc. The predefined types of physical environment can be defined by the user or learned by the user device using machine learning techniques. With reference to FIG. 6A, a physical-environment determinator 610 is configured to, using these predefined types of physical environment, determine one or more predefined types of the physical environment corresponding to the one or more identified particular entities and select one as the type of the physical environment in the direction the user device is facing or in which the user device is located.

As an example, with reference to FIG. 6A, based on the identification that the physical environment includes a baking oven 612, a microwave 614, a coffee machine 616, and a sink 618, physical-environment determinator 610 is configure to determine that the type of the physical environment the user is facing is most likely a kitchen. Physical-environment determinator 610 can be used to perform such determinations by comparing the identified particular entities 612, 614, 616, and 618 to the entities associated with the predefined kitchen type of physical environment. If the number or percentage of the identified particular entities matching with those associated with a predefined type of the physical environment is greater than a threshold number or percentage (e.g., 90%), physical-environment determinator 610 determines that the type of the physical environment is, for example, most likely a kitchen.

Figure 6B:
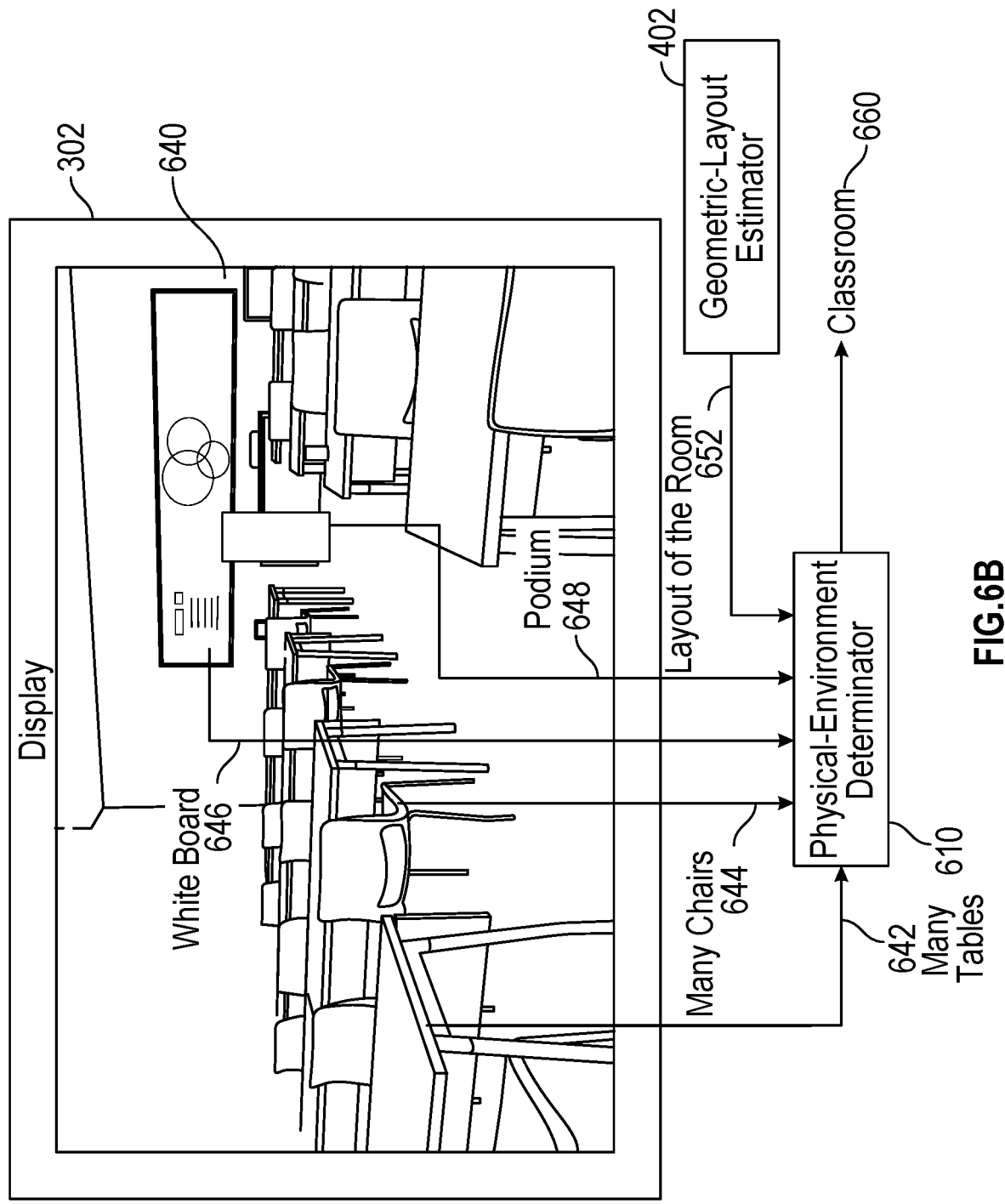
FIG. 6B depicts a physical-environment determinator configured to determine a second type of the physical environment.

In some embodiments, more than one types of physical environment may include the same particular entities. For example, with reference to FIGS. 6B and 6C, with respect to both a classroom environment 660 shown by image 640 and a conference environment 680 shown in image 670, classifiers of the user device may identify one or more similar particular entities. As illustrated in FIG. 6B, classifiers of the user device are used to identify particular entities, such as a whiteboard 646, a plurality of chairs 644, one or more tables 642, and a podium 648. Similarly, as illustrated in FIG. 6C, classifiers of the user device are configured to identify particular entities, such as a whiteboard 662, a plurality of chairs 664, one or more tables 666, and a projector 668. As a result, physical-environment determinator 610 may not be able to determine, based solely on the identified particular entities, the type of physical environment the user is facing or located in. In some embodiments, physical-environment determinator 610 can be configured to determine the type of physical environment using other information in addition to the identified particular entities. Such additional information includes, for example, the geometric layout of the physical environment, neural network models, and/or context information.

As an example illustrated in FIGS. 6B and 6C, in some embodiments, physical-environment determinator 610 is used to determine the type of physical environment using the geometric layouts 652 or 672 provided by geometric-layout estimator 402, respectively. For instance, the geometric layout of a classroom environment illustrated in FIG. 6B is such that the tables are separately disposed from one another, and all or most of the chairs are facing the whiteboard. In contrast, the geometric layout of a conference room environment illustrated in FIG. 6C is such that the tables are closely disposed from one another or in contact with one another, and the chairs are mostly in two groups that facing each other. As a result, using the geometric layouts, physical-environment determinator 610 can determine that the physical environment displayed in FIG. 6B corresponds to a classroom environment 660, while the physical environment displayed in FIG. 6C corresponds to a conference environment 680.

As described above, physical environments (e.g., indoor environment or outdoor environment) may include a variety of entities. Some of these entities are transitory items that may not be reliable indicators for determining the type of physical environment. Such transitory items (e.g., a cat, a vehicle) can have high mobility relative to other items (e.g., a building, a tree). Mobility is a property that describes the degree to which an entity or physical object is physically moveable (e.g., the ability to change positions over time). Some non-transitory or stationary physical objects have low mobility. For example, they do not move or do not move over a long period of time. In some embodiments, these transitory items are not used for determining the type of physical environment.

Figure 7A:
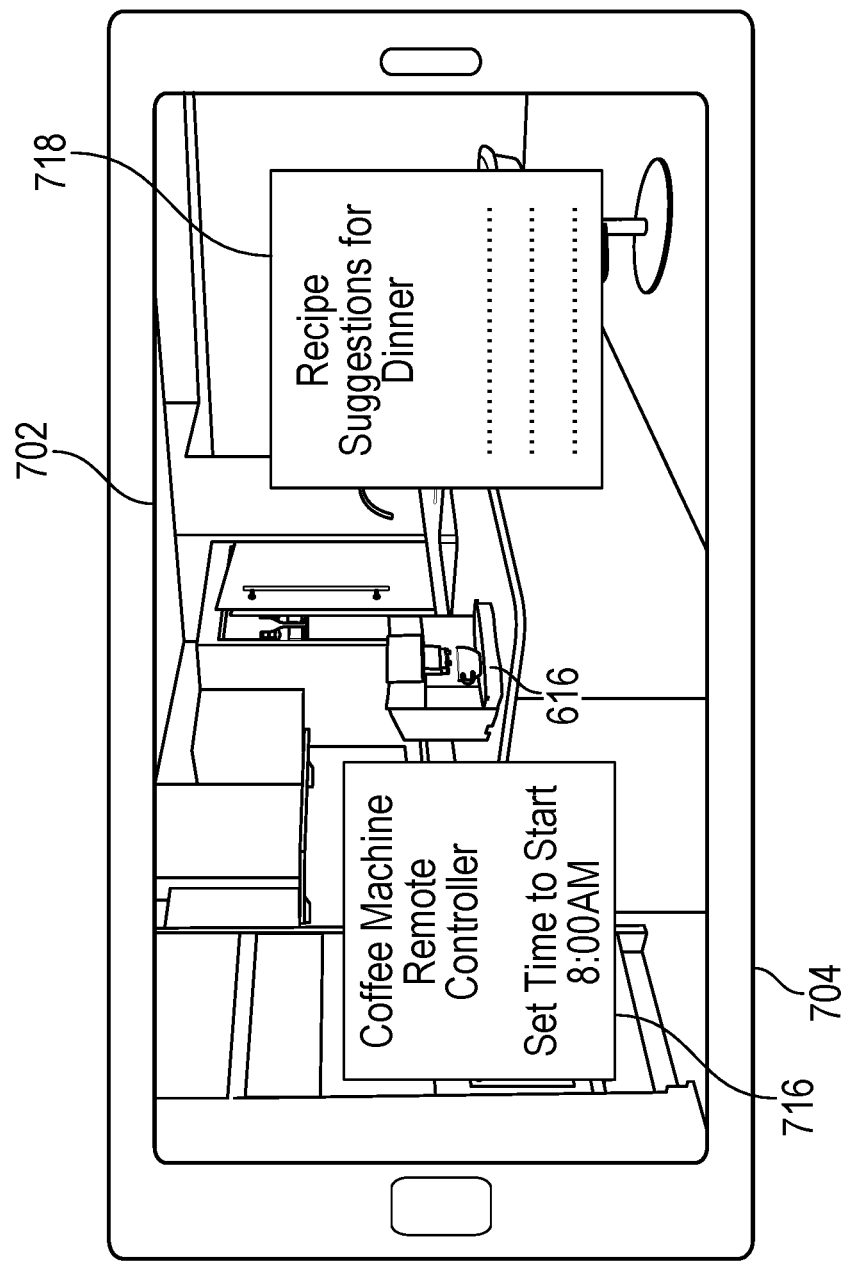
FIG. 7A depicts a user device displaying virtual-reality objects corresponding to a representation of a first type of the physical environment in an AR interface.
Figure 7B:
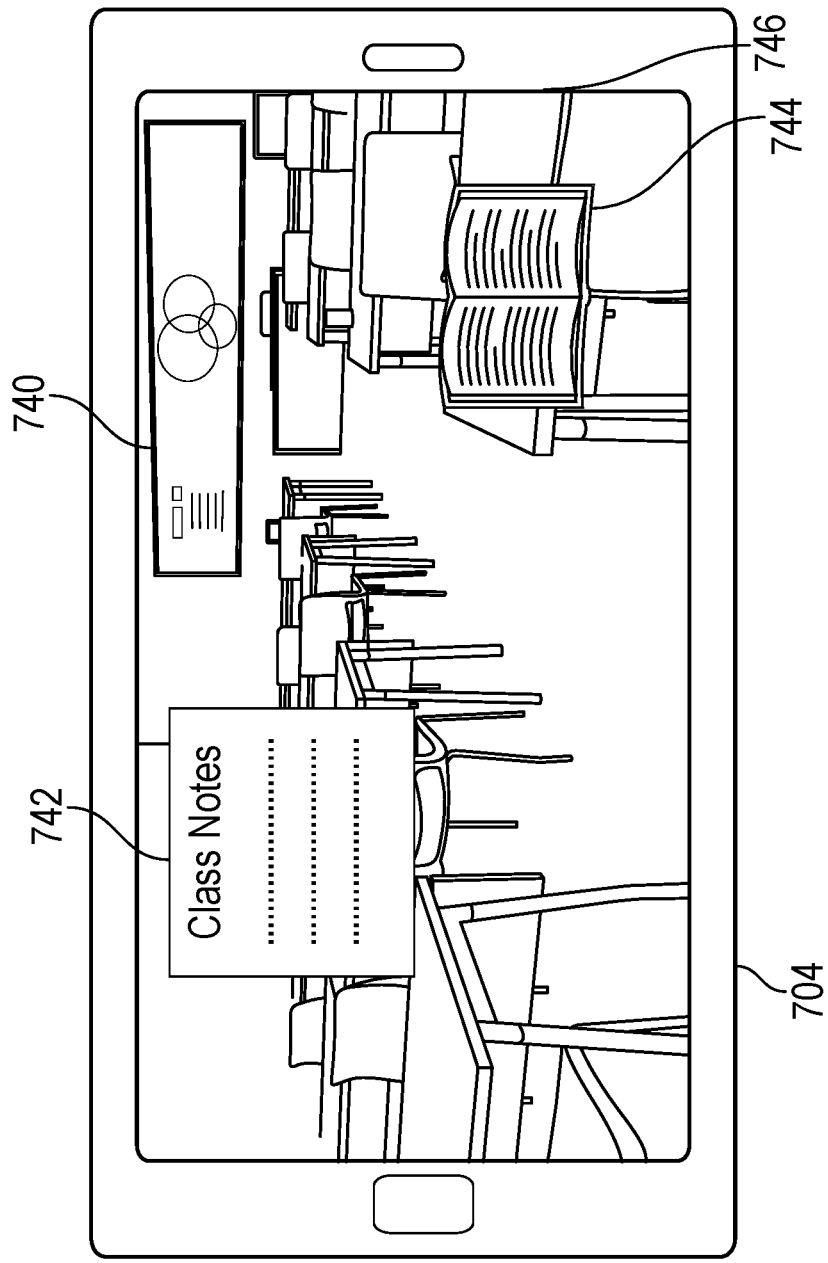
FIG. 7B depicts a user device displaying virtual-reality objects corresponding to a representation of a second type of the physical environment in an AR interface.
Figure 7C:
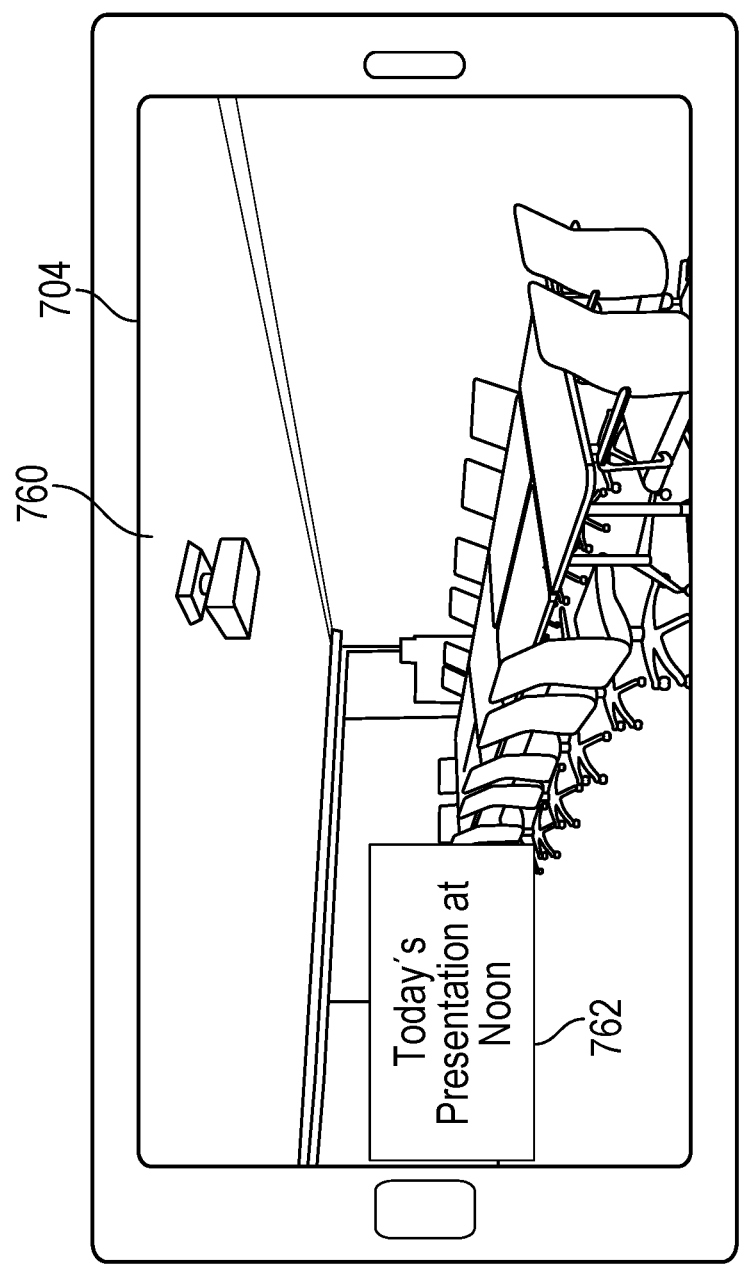
FIG. 7C depicts a user device displaying virtual-reality objects corresponding to a representation of a third type of the physical environment in an AR interface.

FIG. 7A-7C depict a user device displaying virtual-reality objects corresponding to representations of various types of physical environments in AR interfaces. With reference to FIGS. 7A-7C, based on the type of the physical environment in the direction the user device is facing or in which the user device is located, the user device is configured to provide services (e.g., displays one or more virtual-reality objects) corresponding to the physical environment. As illustrated in FIG. 7A, in some embodiments, user device 704 displays a representation 702 of the kitchen. Representation 702 can be, for example, a 2D image, a video, an animation, a 3D image, or any type of visual representation of the kitchen or particular entities in the kitchen. For example, user device 704 displays a representation of the identified particular entities in the physical environment (e.g., a representation of the coffee machine 616). As described above, particular entities in the physical environment can be identified using hierarchical classifications.

In some embodiments, user device 704 can be configured to, while displaying representation 702 of the kitchen, provide one or more services using one or more virtual-reality objects corresponding to the physical environment. The one or more services correspond to the physical environment in the direction the user device is facing or in which the user device is located. With reference to FIG. 7A, as described above, the physical environment in this embodiment is determined to be a kitchen and one or more particular entities, such as the coffee machine, are identified using hierarchical classifications. As a result, user device 704 can provide, for example, a virtual-reality object 716 (e.g., a virtual-reality remote controller), sometimes also referred to as a virtual object, enabling the user to remote control the coffee machine (e.g., set the time to start brewing at 8 AM); and a virtual-reality object 718 (e.g., a user-interface for recipe suggestions) providing dinner suggestions to the user. In some embodiments, the virtual-reality objects can be superimposed on representation 702 of the kitchen. Virtual-reality objects can also be provided in a separate display area of user device 704 or another device communicatively coupled to user device 704. In some examples, displaying the virtual object includes displaying the virtual object in a 3D stereoscopic format using a plurality of displays of the user device 704.

With reference to FIG. 7B, as described above, the physical environment in this example is determined to be a classroom and one or more particular entities, such as the whiteboards, tables, and chairs are identified using hierarchical classifications. As a result, user device 704 can display a representation 740 of the classroom, and provide, for example, a virtual-reality object 742 (e.g., a user interface for taking class notes) enabling the user to input class notes; and a virtual-reality object 744 (e.g., a virtual-reality book) providing the textbook for the class. In some embodiments, the virtual-reality objects can be superimposed on representation 740 of the classroom. Virtual-reality objects can also be provided in a separate display area of user device 704 or another device communicatively coupled to user device 704.

As illustrated in FIG. 7B and described above, user device 704 can identify one or more particular entities in classroom (e.g., tables, chairs, whiteboards, podium) using hierarchical classifications. In some embodiments, user device 704 further estimates parameters associated with the position and orientation of the one or more identified particular entities. For example, user device 704 can estimate the six degrees of freedom of a particular entity, which are the number of independent coordinates defining or specifying the position of the particular entity. Based on the six degrees of freedom, user device 704 can determine the position of the particular entity. In some embodiments, user device 704 also estimates the orientation of the particular entity. Based on the obtained image data, user device 704 estimates, for example, whether a particular table is facing upward or is placed sideways. In some embodiments, based on the estimated parameters (e.g., positions and/or orientations), user device 704 facilitates user interaction with the virtual-reality objects. As illustrated in FIG. 7B, based on the positions and/or orientations of a table in the classroom, user device 704 renders a virtual-reality object 744 (e.g., a virtual-reality book) on top of representation 746 of a table being displayed. User device 704 can further facilitate the user to interact with virtual-reality object 744 by, for example, allowing the user to flip the book, highlight the book, close the book, write notes on the book, or the like.

With reference to FIG. 7C, as described above, the physical environment in this example is determined to be a conference room and one or more particular entities such as the whiteboards, tables, and chairs are identified using hierarchical classifications. As a result, user device 704 can display a representation 760 of the conference room, and provide a virtual-reality object 762 (e.g., an application displaying the presentation for today's meeting at noon) enabling the user to view/edit/practice the presentation. In some embodiments, the virtual-reality objects can be superimposed on representation 760 of the conference room. Virtual-reality objects can also be provided in a separate display area of user device 704, or another device communicatively coupled to user device 704.

In some embodiments, a user device can detect an event associated with at least one of the physical environment or a user activity, and provide environment-based services using one or more virtual-reality objects in response to detecting the event. An event can be related to a variation of the physical environment (e.g., addition, removing, or altering a particular entity in the physical environment). With reference to FIG. 7C, an event may be associated with the meeting attendees (not shown) entering the conference room. An event can be related to a user activity. For example, the event may be associated with the user entering the conference room from another room, or may be associated with the user interacting with one or more particular entities (e.g., the projector or a person) in the conference room.

The user device can be configured to, in response to detecting a triggering event, perform one or more of the above described tasks: obtaining image data; identifying one or more predefined entities of the plurality of predefined entities in the physical environment; determining the geometric layout of the physical environment; determining the area corresponding to the particular entity; identifying a particular entity; determining the type of the physical environment; and displaying one or more virtual-reality objects corresponding to the representation of the physical environment. For example, with reference to FIG. 7C, user device 704 monitors the conference room (e.g., using one or more sensors such as cameras, microphones, infrared sensors, or the like) to detect event associated with the conference room or a user activity. In response to detecting the event (e.g., meeting attendees entering the room), user device 704 identifies one or more newly added particular entities (e.g., the meeting attendees that just entered the room) and display virtual-reality objects 762 (e.g., display today's presentation).

In some embodiments, the user device can be configured to store data associated with the physical environment. For example, the user device can store the obtained image data of a physical environment, the identified particular entities, the determined type of the physical environment, or the like. The user device can monitor the physical environment and user activity to obtain and store new data associated with detecting an event. For example, with reference to FIG. 7C, as more meeting attendees (not shown) enter the conference room, the user device only needs to identify the attendees that newly enter the room and does not need to determine the type of the physical environment again.

In some embodiments, the user device, or one or more components thereof, can be configured to enter a power-saving or low-power mode and re-enter a normal operation mode upon detecting an event. For example, one or more cameras of the user device can be configured to enter a low-power mode or be turned off if the user device detects no event for a predefine period of time (e.g., 1 minute). Subsequently, after the user device detects an event (e.g., meeting attendees entering the conference room), the cameras (e.g., an event camera) can be reactivated (e.g., re-enabled) or wake up for obtaining images of the newly-added particular entities in the physical environment (e.g., identifying the meeting attendees newly entered the conference room).

Figure 8:
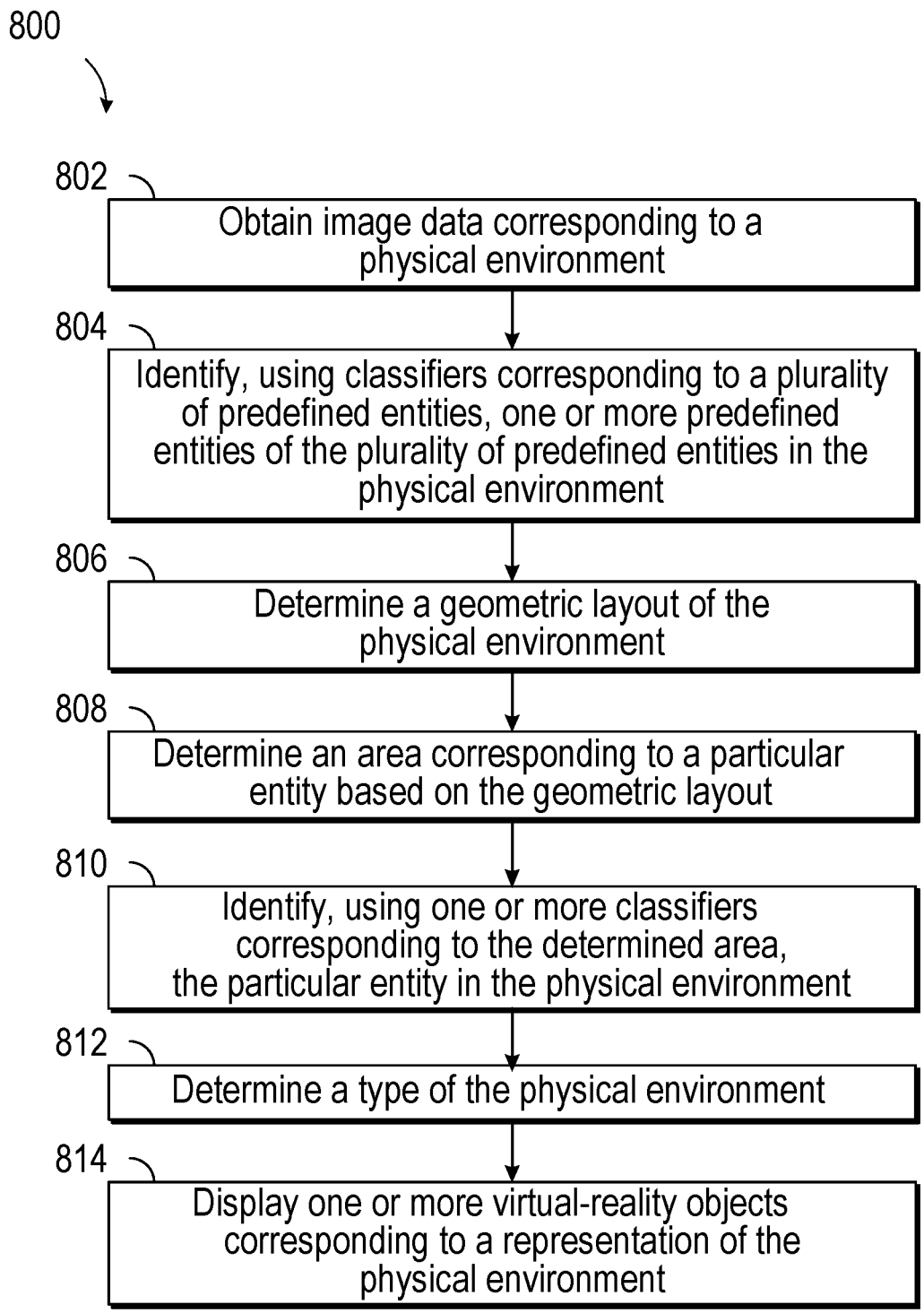
FIG. 8 depicts a flow chart of an exemplary technique for providing content in an AR environment.

Turning now to FIG. 8, a flow chart of exemplary process 800 for providing content in an AR environment. In the description below, process 800 is described as being performed using a user device (e.g., device 100a or 202). The user device is, for example, a handheld mobile device or a head-mounted device. It should be recognized that, in other embodiments, process 800 is performed using two or more electronic devices, such as a user device that is communicatively coupled to another device, such as a base device. In these embodiments, the operations of process 800 are distributed in any manner between the user device and the other device. Further, it should be appreciated that the display of the user device can be transparent or opaque. Although the blocks of process 800 are depicted in a particular order in FIG. 8, it should be appreciated that these blocks can be performed in any order. Further, one or more blocks of process 800 can be optional and/or additional blocks can be performed.

At block 802, image data corresponding to a physical environment are obtained. The image data are captured using one or more cameras of the user device.

At block 804, an initial classification is performed and one or more predefined entities of the plurality of predefined entities in the physical environment are identified using a plurality of classifiers corresponding to a plurality of predefined entities. In some embodiments, the plurality of classifiers corresponding to the plurality of predefined entities is a subset less than the full set of available classifiers. The identification is based on the image data. For example, to identify the one or more predefined entities, it is determined, for each unit of the obtained image data, one or more candidate classes associated with the one or more predefined entities of the plurality of predefined entities. Next, the one or more candidate classes associated with the one or more predefined entities are ranked; and one or more classes of the ranked candidate classes are determined as the classes corresponding to the one or more predefined entities in the physical environment.

At block 806, based on the one or more of the identified predefined entities, a geometric layout of the physical environment is determined. For example, to determine the geometric layout, spatial information associated with one or more of the identified predefined entities in the physical environment is determined. In some embodiments, determining the spatial information include determining spatial positions of the one or more of the identified predefined entities using a coordinate system and determining alignment of the one or more of the identified predefined entities based the determined spatial positions of the one or more of the identified predefined entities. Depth information associated with the one or more of the identified predefined entities is further determined. For instance, determining the depth information can include estimating the depth information using a plurality of cameras of the one or more cameras, and/or using a depth sensor. The geometric layout of the physical environment is thus estimated in accordance with the spatial information and the depth information.

At block 808, based on the geometric layout of the physical environment, an area corresponding to a particular entity is determined. The particular entity corresponds to one or more identified predefined entities. In some embodiments, to determine the area, a spatial position of the particular entity within the physical environment is determined. Based on the spatial position of the particular entity and the geometric layout of the physical environment, one or more candidate areas corresponding to the particular entity are determined. And one of the one or more candidate areas is selected as the area corresponding to the particular entity within the physical environment.

At block 810, based on the area corresponding to the particular entity, the particular entity in the physical environment is identified using one or more classifiers corresponding to the determined area. In some embodiments, to identify the particular entity, the one or more classifiers corresponding to the determined area are obtained. In some embodiments, obtaining the one or more classifiers corresponding to the determined area includes obtaining the one or more classifiers based on contextual information associated with the physical environment. Using the one or more classifiers corresponding to the determined area, one or more candidate classes associated with the particular entity are determined. The one or more candidate classes are ranked based on machine learning models. And one of the one or more ranked candidate classes is selected as the class corresponding to the particular entity.

In some embodiments, using one or more classifiers corresponding to the particular entity, a second particular entity in the physical environment different from the particular entity is identified.

At block 812, based on the identified particular entity, a type of the physical environment is determined. In some embodiments, to determine the type of the physical environment, it is determined, based on a plurality of predefined types of the physical environment, one or more predefined types corresponding to the identified particular entity. And one of the one or more predefined types is selected as the type of the physical environment.

At block 814, based on the type of the physical environment, one or more virtual-reality objects are displayed corresponding to a representation of the physical environment. In some embodiments, displaying the virtual-reality objects includes displaying the representation of the physical environment; and providing one or more services using the one or more virtual-reality objects. The one or more services correspond to the type of the physical environment. In some embodiments, providing the services includes estimating, based on the identified particular entity, parameters associated with orientation of the identified particular entity. Based on the estimated parameters associated with orientation of the identified particular entity, it is facilitated user interaction with the displayed representation of the identified particular entity.

In some embodiments, displaying the representation of the physical environment includes displaying a representation of the identified particular entity. In some embodiments, displaying the representation of the physical environment includes displaying the representation of the identified particular entity in a 3D format.

In some embodiments, performance of a task by the user device can be triggered by detecting an event associated with at least one of the physical environment or a user activity. The task can include one or more of: obtaining the image data; identifying the one or more predefined entities of the plurality of predefined entities in the physical environment; determining the geometric layout of the physical environment; determining the area corresponding to the particular entity; identifying the particular entity; determining the type of the physical environment; and displaying the one or more virtual-reality objects corresponding to the representation of the physical environment.

Aspects of the techniques described above contemplate the possibility of gathering and using personal information to provide environment-based services to the user, which enhances the user experience and improves the performance of the system. Such information should be collected with the user's informed consent.

Entities handling such personal information will comply with well-established privacy practices and/or privacy policies (e.g., that are certified by a third-party) that are (1) generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
   a camera;
   a memory;
   one or more processors operatively coupled to the memory; and
   computer-executable instructions stored in the memory and configured to be executed by the one or more processors, the computer-executable instructions including instructions for:
     obtaining image data, using the camera, of a physical setting;
     based on the image data, identifying one or more physical objects in the physical setting, using classifiers of physical objects;
     based on the one or more of the identified physical objects, determining a geometric layout of the physical setting; and
     displaying a virtual object associated with the physical setting based on the determined geometric layout.

2. The electronic device of claim 1, wherein the computer-executable instructions further include instructions for:
   determining a type of the physical setting using identified physical objects located in a part of the geometric layout of the physical setting, and
   wherein displaying the virtual object associated with the physical setting comprises displaying the virtual object based on the type of the physical setting.

3. The electronic device of claim 1, wherein determining the geometric layout of the physical setting comprises:
   determining whether an identified physical object is indicated as having low mobility; and responsive to determining that the identified physical object is indicated as having low mobility, using the identified physical object in determining the geometric layout of the physical setting.

4. The electronic device of claim 1, wherein the identified one or more of physical objects includes a kitchen appliance, wherein the determined type of the physical setting is a kitchen, wherein the geometric layout includes a surface representing a countertop, and wherein the displayed virtual object includes a recipe.

5. The electronic device of claim 1, wherein determining the geometric layout of the physical setting comprises:
   determining spatial information associated with one or more of the identified physical objects in the physical setting;
   determining distance of the one or more of the identified physical object relative to the electronic device; and
   estimating the geometric layout of the physical setting in accordance with the spatial information and a depth information.

6. The electronic device of claim 5, wherein determining the distance of the one or more of the identified physical objects comprises estimating depth of a physical object relative to the electronic device using a depth sensor of the electronic device.

7. The electronic device of claim 1, wherein identifying one of the one or more physical objects in the physical setting comprises:
   determining, using one or more object classifiers, one or more candidate classes associated with the physical object;
   ranking the one or more candidate classes based on respective confidence probability provided by the object classifiers;
   selecting a candidate class based on the ranking; and
   identifying a physical object located in the physical setting as an object of the selected candidate class.

8. The electronic device of claim 1, wherein the computer-executable instructions further include instructions for:
   providing one or more services using the virtual object, wherein the one or more services correspond to the identified type of the physical setting.

9. The electronic device of any of claim 1, wherein the computer-executable instructions further include instructions for:
   providing one or more services using the virtual object, wherein the one or more services correspond to the determined geometric layout of the physical setting.

10. The electronic device of claim 1, wherein displaying the virtual object comprises displaying the virtual object in a 3D stereoscopic format using a plurality of displays of the electronic device.

11. The electronic device of claim 1, wherein:
   identifying the one or more physical objects in the physical setting using classifiers of physical objects comprises:
      identifying the one or more physical objects in the physical setting using a plurality of classifiers corresponding to the one or more physical objects,
   wherein the computer-executable instructions further include instructions for:
      based on the determined geometric layout of the physical setting, determining an area;
      based on the determined area, identifying, using one or more classifiers corresponding to the determined area, a physical object in the physical setting, wherein the physical object is associated with the determined area; and
      based on the identified particular physical object, determining a type of the physical setting; and
   displaying the virtual object associated with the physical setting based on the determined geometric layout comprises:
      based on the type of the physical setting, displaying the virtual object associated with the physical environment.

12. A non-transitory computer-readable storage medium storing one or more programs configured to be executed by one or more processors of an electronic device with a camera, the one or more programs including instructions for:
   obtaining image data, captured using a camera, of a physical setting;
   based on the image data, identifying a plurality of predefined physical objects in the physical setting, using a plurality of classifiers of physical objects;
   based on the one or more of the identified physical objects, determining a geometric layout of the physical setting; and
   displaying a virtual object associated with the physical setting based on the determined geometric layout.

13. The non-transitory computer-readable storage medium of claim 12, wherein the one or more programs further include instructions for:
   determining a type of the physical setting using identified physical objects located in a part of the geometric layout of the physical setting, and
   wherein displaying the virtual object associated with the physical setting comprises displaying the virtual object based on the type of the physical setting.

14. The non-transitory computer-readable storage medium of claim 12, wherein determining the geometric layout of the physical setting comprises:
   determining spatial information associated with one or more of the identified physical objects in the physical setting;
   determining distance of the one or more of the identified physical object relative to the electronic device; and
   estimating the geometric layout of the physical setting in accordance with the spatial information and the depth information.

15. The non-transitory computer-readable storage medium of claim 12, wherein identifying one of the one or more physical objects in the physical setting comprises:
   determining, using one or more object classifiers, one or more candidate classes associated with the physical object;
   ranking the one or more candidate classes based on respective confidence probability provided by the object classifiers;
   selecting a candidate class based on the ranking; and
   identifying a physical object located in the physical setting as an object of the selected candidate class.

16. The non-transitory computer-readable storage medium of claim 12, wherein the one or more programs further include instructions for:
   providing one or more services using the virtual object, wherein the one or more services correspond to the identified type of the physical setting.

17. The non-transitory computer-readable storage medium of any of claim 12, wherein the one or more programs further include instructions for:

providing one or more services using the virtual object, wherein the one or more services correspond to the determined geometric layout of the physical setting.

18. The non-transitory computer-readable storage medium of claim 12, wherein:
identifying the one or more physical objects in the physical setting using classifiers of physical objects comprises:
identifying the one or more physical objects in the physical setting using a plurality of classifiers corresponding to the one or more physical objects,
wherein the one or more programs further include instructions for:
based on the determined geometric layout of the physical setting, determining an area;
based on the determined area, identifying, using one or more classifiers corresponding to the determined area, a physical object in the physical setting, wherein the physical object is associated with the determined area; and
based on the identified particular physical object, determining a type of the physical setting; and
displaying the virtual object associated with the physical setting based on the determined geometric layout comprises:
based on the type of the physical setting, displaying the virtual object associated with the physical environment.

19. A method comprising:
at an electronic device with one or more processors, memory, and a camera:
obtaining image data, using the camera, of a physical setting;
based on the image data, identifying one or more physical objects in the physical setting, using classifiers of physical objects;
based on the one or more of the identified physical objects, determining a geometric layout of the physical setting; and
displaying a virtual object associated with the physical setting based on the determined geometric layout.

20. The method of claim 19, further comprising:
determining a type of the physical setting using identified physical objects located in a part of the geometric layout of the physical setting, and
wherein displaying the virtual object associated with the physical setting comprises displaying the virtual object based on the type of the physical setting.

21. The method of claim 19, wherein determining the geometric layout of the physical setting comprises:
determining spatial information associated with one or more of the identified physical objects in the physical setting;
determining distance of the one or more of the identified physical object relative to the electronic device; and
estimating the geometric layout of the physical setting in accordance with the spatial information and the depth information.

22. The method of claim 19, wherein identifying one of the one or more physical objects in the physical setting comprises:
determining, using one or more object classifiers, one or more candidate classes associated with the physical object;
ranking the one or more candidate classes based on respective confidence probability provided by the object classifiers;
selecting a candidate class based on the ranking; and
identifying a physical object located in the physical setting as an object of the selected candidate class.

23. The method of claim 19, wherein:
identifying the one or more physical objects in the physical setting using classifiers of physical objects comprises:
identifying the one or more physical objects in the physical setting using a plurality of classifiers corresponding to the one or more physical objects,
the method further comprising:
based on the determined geometric layout of the physical setting, determining an area;
based on the determined area, identifying, using one or more classifiers corresponding to the determined area, a physical object in the physical setting, wherein the physical object is associated with the determined area; and
based on the identified particular physical object, determining a type of the physical setting, and
displaying the virtual object associated with the physical setting based on the determined geometric layout comprises:
based on the type of the physical setting, displaying the virtual object associated with the physical environment.

* * * * *

UNITED STATES PATENT AND TRADEMARK OFFICE
CERTIFICATE OF CORRECTION

PATENT NO. : 11,074,451 B2
APPLICATION NO. : 16/833364
DATED : July 27, 2021
INVENTOR(S) : Peter Meier et al.

Page 1 of 1

It is certified that error appears in the above-identified patent and that said Letters Patent is hereby corrected as shown below:

In the Claims

In Column 21, Line 45, Claim 9, before "claim" delete "any of".

In Column 22, Line 66, Claim 17, before "claim" delete "any of".

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*